Patented Apr. 21, 1931

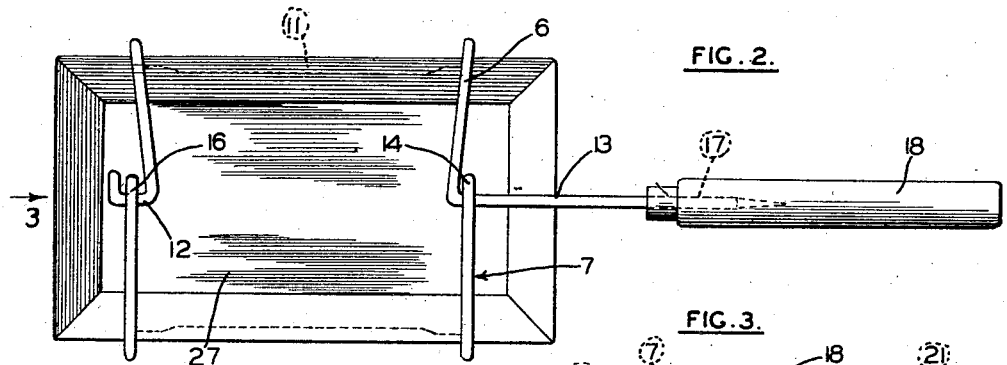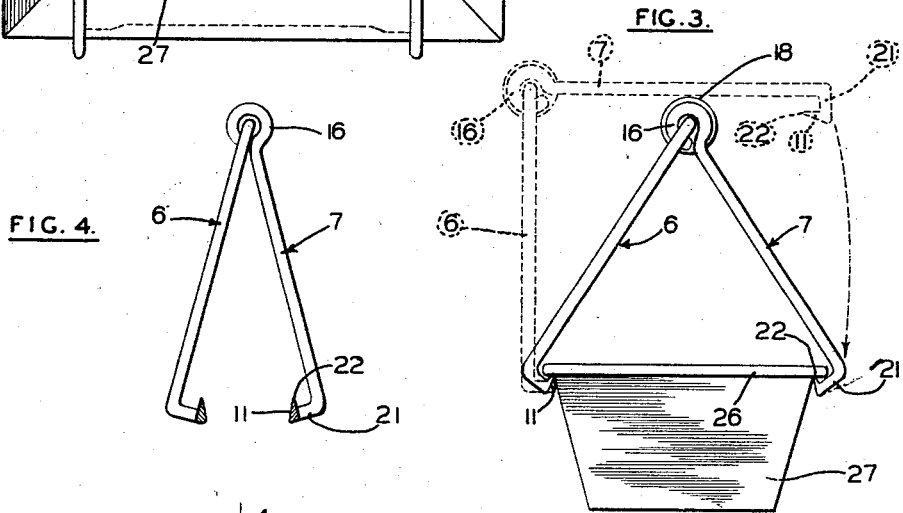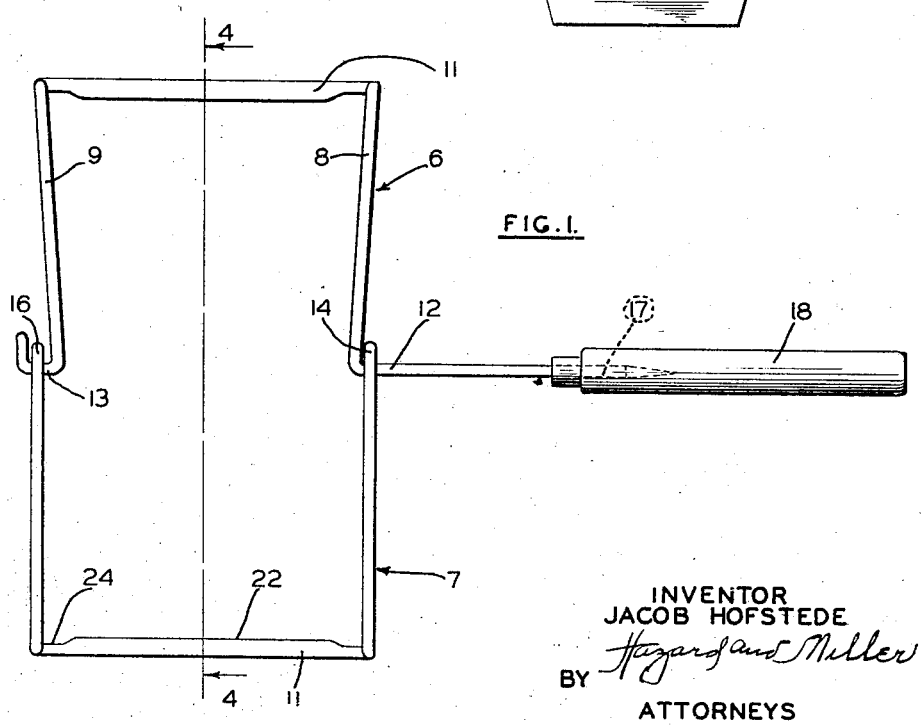

1,801,860

UNITED STATES PATENT OFFICE

JACOB HOFSTEDE, OF FULLERTON, CALIFORNIA

LIFTER

Application filed February 12, 1930. Serial No. 427,761.

This invention relates to kitchen utensils, and more particularly to a lifting device whereby a wide variety of sizes and shapes of receptacles such as pie-pans, baking tins and the like, may be lifted and transported.

An object of the invention is to provide a lifting device of this general character, which constitutes a material improvement over that disclosed in Patent No. 1,556,113, issued to me on October 6, 1925.

A more detailed object is the provision of a lifting device as described, in which special means are provided for lifting rectangularly-shaped utensils such as baking tins.

A further object is to provide a lifting device so designed that a more efficient gripping action is developed between the lifting device and the article lifted thereby, and in this manner, to increase the efficiency of the tool in carrying out the functions for which it is designed.

A further object of the invention is the provision of a device of the general character described, which will possess advantages in points of efficiency and durability, which is inexpensive to manufacture, and yet which is simple in construction and operation.

The invention possesses other objects and advantageous features, some of which, with those enumerated, will be set forth in the following description of the invention's particular embodiment which is illustrated in the drawings accompanying and forming a part of the specification.

Referring to the drawings:

Figure 1 is a plan view of a lifter constructed in accordance with the principles of the present invention, the parts of the device being shown fully extended.

Fig. 2 is a plan view of the lifting device and of a baking tin engaged thereby, in such a manner as to permit lifting and/or carrying the tin by means of my improved lifter.

Fig. 3 is an end elevation, the direction of view being indicated by the arrow 3 of Fig. 2; and the manner of engaging the lifter with the baking tin, is indicated in dashed lines.

Fig. 4 is a vertical sectional view. The plane of section may be assumed to have been taken upon the line 4—4 of Fig. 1, and the direction of view by the arrows; but the device is shown with the gripping frames swung closer together than as illustrated in Fig. 1.

The device of the present invention is similar to that of my previously issued patent in several respects, being preferably made of relatively heavy wire and in two parts designated a handle part 6 and a hanger part 7. Each of these two parts consists of a U-shaped frame piece comprising spaced legs 8 and 9 lying in a common plane and joined at their outer ends by a bar 11. Hence, each piece 6, 7, presents an open, unobstructed side; and the two pieces 6 and 7 are pivotally joined at these open sides, i. e., at the ends of the legs 8 and 9 opposite the ends to which the bars 11 are joined. A convenient method of pivotally joining the frames is to form straight portions 12 and 13 on the handle piece 6, these straight portions 12 and 13 being disposed in axial alignment with the pivotal connection of the two pieces 6 and 7. Eyes 14 and 16 are formed on the ends of the legs 8 and 9 respectively, of the hanger part 7, these eyes encircling the straight portions 12 and 13 respectively, of the handle part 6. The straight portion 12 is extended axially, and is provided with a tang 17 whereby a wooden or other type of handle 18 may be conveniently attached thereto.

The device of the present invention differs materially from that of my earlier patent, inasmuch as each of the bars 11 is offset from the plane of the associated legs 8 and 9. For this purpose an angular portion 21 is interposed between each leg 8, 9, and the associated end of the associated bar 11. The bars 11 of the two frame pieces 6, 7, are oppositely offset, i. e., the angular portions 21 of the two frame pieces, extend toward each other as best shown upon Figs. 3 and 4. Furthermore, the bars 11 are flattened in planes extending substantially in parallelism with the planes of the associated legs 8, 9, and that edge 22 of each flattened bar 11, which is proximal to the axis of pivotal connection of the two frames 6, 7, is relatively sharp. Also, this sharpened edge 22 of each bar 11, is offset slightly so that the edge 22 is closer to the axis of the pivotal connection of the two frames than at the portions 24 of the bar 11 joining the legs 8 and 9.

Figs. 2 and 3 show the lifter engaged with a conventional baking pan, in such a manner that the pan may be lifted and carried thereby. The device is applied to the pan to be lifted by grasping the handle 18 and holding the device with the hanger part 7 depending from the handle part 6 as indicated in dashed lines upon Fig. 3, and with the frame of the handle part 6 elevated. The entire device is then moved laterally so as to position the flattened bar 11 of the hanger part 7, under the rim flange 26 of the pan 27 or other article to be lifted. The handle part 6 is then swung downwards, the bar 11 thereof moving in substantially the direction indicated by the dashed line upon Fig. 3, so as to position the bar under the opposite side of the rim flange, thus positioning the device as shown upon Figs. 2 and 3. The pan and lifter may then be lifted vertically, the bars 11 becoming locked under opposite sides of the rim flange 26, in such a manner that the weight of the pan 27 and its contents, cooperate with the interaction of the hinged handle and hanger parts 6 and 7, to effect a firmer engagement of the lifter with the pan 27.

The improvement of the device of the present invention, lies in the offsetting and sharpening of the bars 11. Inasmuch as each bar 11 is offset from the plane of the associated legs 8 and 9, it is possible to position the flattened bar under the rim flange 26 of a receptacle having straight sides, even though that receptacle is longer than the distance between the legs 8 and 9. The flattening and sharpening of the bars 11 enhances the efficiency of the device because this detail of construction makes it possible to lift the cover from a sauce-pan, the sharpened edge of the bar 11 being able to enter the relatively narrow space between the cover and the pan where a thicker bar could not. Furthermore, the sharpened edge 22 of each bar 11, makes a firmer seat in the interaction of the rim flange 26 with the side walls of a pan 27, so that the surety of the engagement of the lifter with such a pan is materially increased. So secure is the engagement of the lifter with a pan gripped thereby in this manner, that it is entirely possible to support a container by means of my lifting device, and tilt the container far enough to one side to completely empty it of its contents without danger of permitting the receptacle to become detached from the lifting device, the only requirement being that the tilting is done in the direction of the handle part, so as to increase the pull exerted against the hanger part, and prevent the bar 11 of the hanger part slipping out from under the associated portion of the rim flange.

The elongated straight portion 12 and the handle 18 mounted thereupon, make it possible to lift and transport heated articles without danger of burning the hands. Furthermore, receptacles may be inserted into and removed from a heated oven thereby, without discomfort to the operator, because of the fact that the gripping portion of the lifter may be inserted into the oven without the necessity of having to place the handle 18 therein.

It is to be understood that the details of the invention as herein disclosed, are subject to alteration within the spirit or scope of the appended claims.

I claim:

1. In a lifting device, a pair of U-shaped frames, each comprising spaced legs lying in a common plane and a bar joining the lower ends thereof, said frames being pivotally joined at the other ends of their legs, and the bars of said frames being oppositely offset from the plane of the respective associated legs, each of said bars being flattened in a plane substantially parallel to that of the associated legs, and a handle rigid with one of said frames and extending therefrom in alignment with the axis of the pivotal connection of the frames.

2. In a lifting device, a pair of U-shaped frames, each comprising spaced legs lying in a common plane and a bar joining the lower ends thereof, said frames being pivotally joined at the other ends of their legs, and the bars of said frames being oppositely offset from the plane of the respective associated legs, each of said bars being flattened in a plane substantially parallel to that of the associated legs, and that edge of each bar proximal to the pivotal connection of the frames being relatively sharp, and a handle rigid with one of said frames and extending therefrom in alignment with the axis of said pivotal connection.

3. In a lifting device, a pair of U-shaped frames, each comprising spaced legs lying in a common plane and a bar joining the lower ends thereof, said frames being pivotally joined at the other ends of their legs, and the bars of said frames being oppositely offset from the plane of the respective associated legs, each of said bars being flattened in a plane substantially parallel to that of the associated legs, and that edge of each bar proximal to the pivotal connection of the frames being relatively sharp and being offset closer to the axis of said pivotal connection than the ends of the associated bar and a handle rigid with one of said frames and extending therefrom in alignment with the axis of said pivotal connection.

In testimony whereof I have signed my name to this specification.

J. HOFSTEDE.